July 8, 1958
G. E. B. BARSTAD
2,842,674
RADIOACTIVE RADIATION INDICATOR
Filed Jan. 11, 1955
6 Sheets-Sheet 1
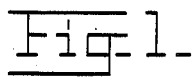
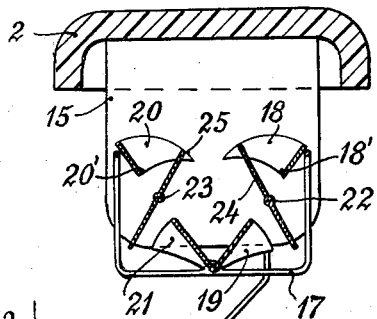
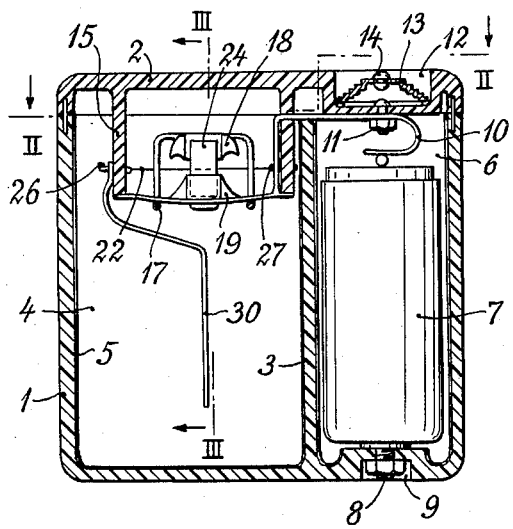
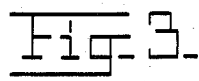
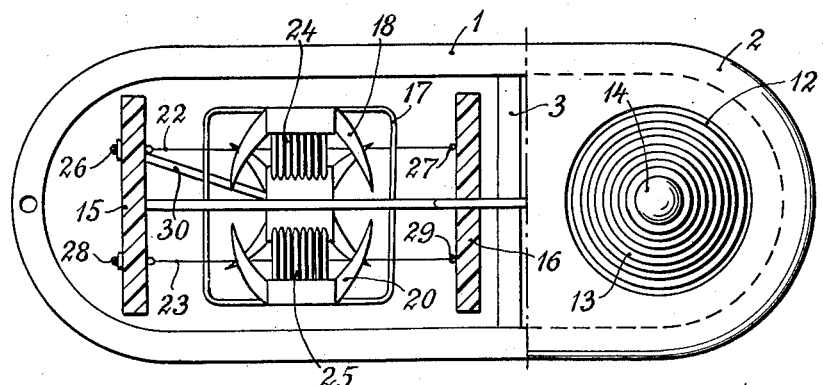
Inventor:
GOTFRED E.B. BARSTAD
by

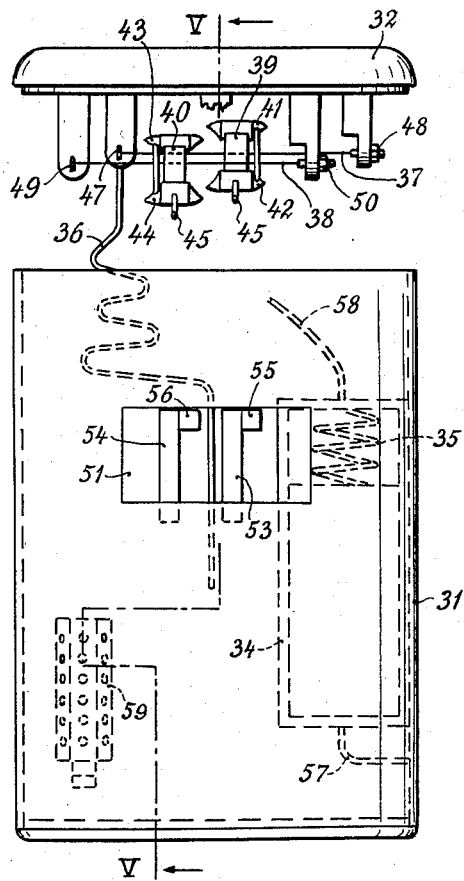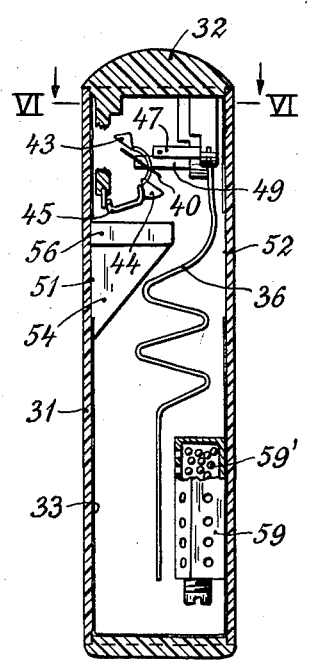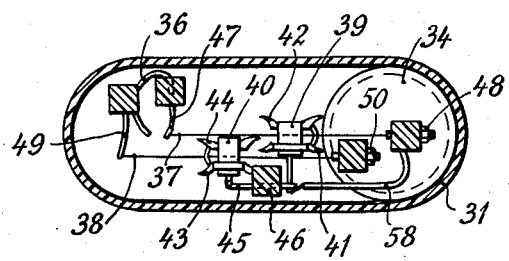

Inventor:
GOTFRED E. B. BARSTAD

July 8, 1958 G. E. B. BARSTAD 2,842,674
RADIOACTIVE RADIATION INDICATOR
Filed Jan. 11, 1955 6 Sheets-Sheet 4

Inventor:
GOTFRED E.B. BARSTAD
by

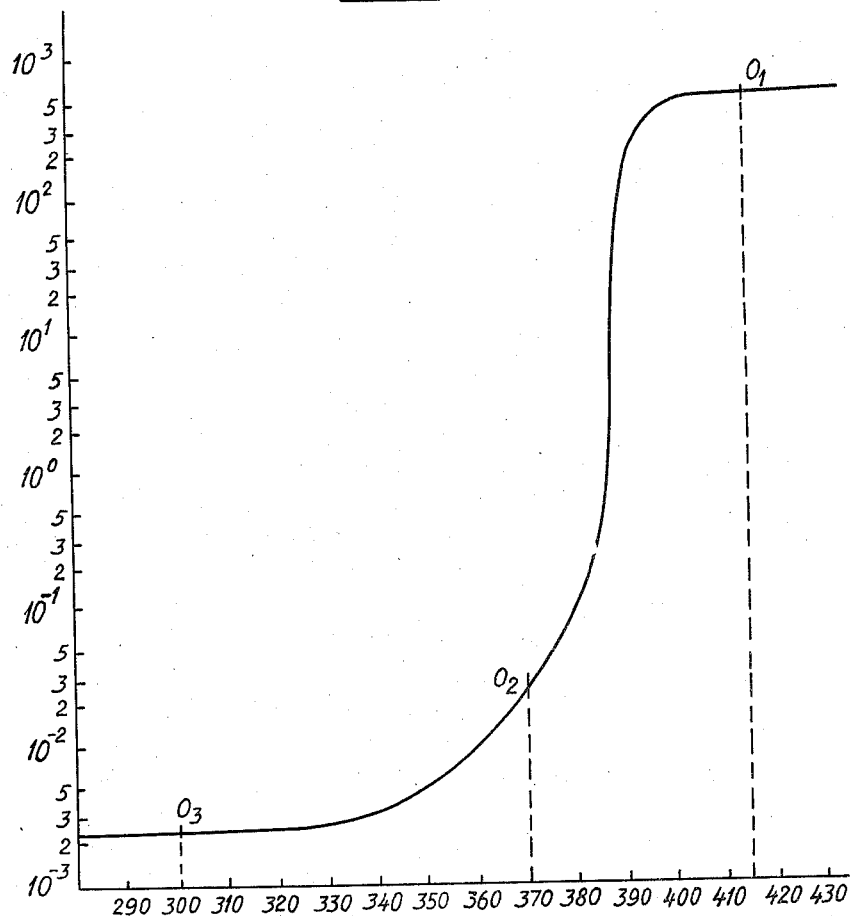

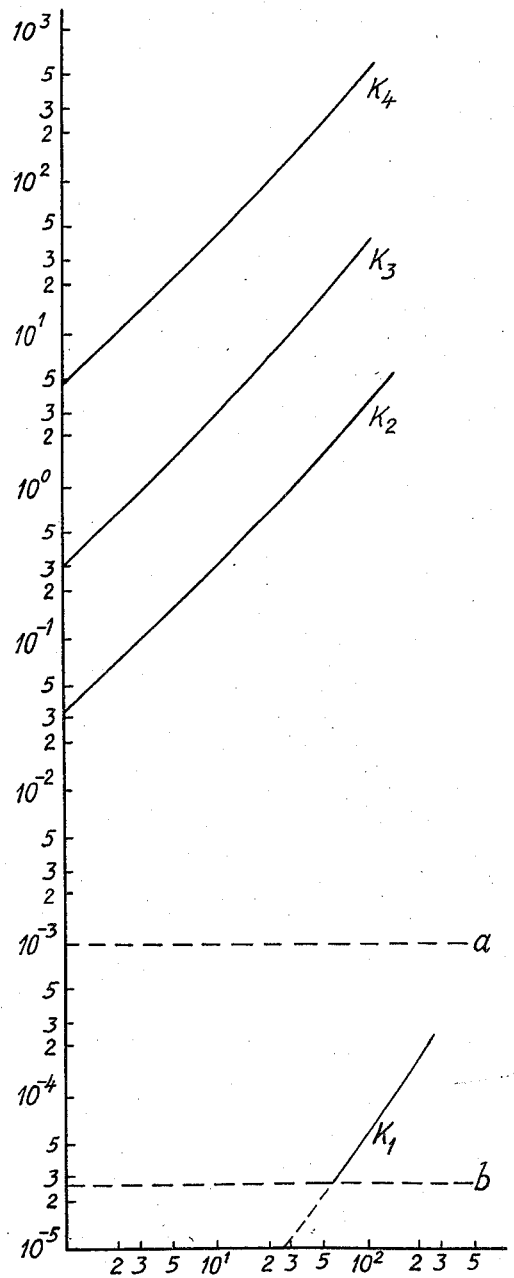

United States Patent Office 2,842,674
Patented July 8, 1958

2,842,674

RADIOACTIVE RADIATION INDICATOR

Gotfred E. B. Barstad, Lillestrom, Norway, assignor to Forsvarets Forskningsinstitutt, Akershus Festning, Oslo, Norway Application January 11, 1955, Serial No. 481,228

Claims priority, application Norway January 18, 1954

9 Claims. (Cl. 250—83.6)

The invention relates to radiation indicators, particularly for radioactive radiation, and has for a primary object to provide a handy and robust portable radiation indicator for field use and, if desired, also for use by the civil population, for detecting radioactive radiation, especially γ-radiation, which may occur after atomic explosions, in order thereby to make it possible to decide whether an occurring radiation is dangerous and by trial to find out places affording the best possible shelter.

The indicator used is of the type which comprises a closed casing and an electrometer mounted therein and having a fixed and a movable electrode, one of which forms part of a charge-receiving structure and the other of which by means of a D. C. voltage source is kept on a certain potential relative to one pole of an electric field, the opposite pole of which forms part of the said charge-receiving structure, which in response to the occurrence of radiation and consequent passage of charges in the field will approach the potential of the opposite field pole, whereby the movable electrode will approach the fixed electrode while overcoming resilient resistance.

The invention primarily consists in the combination that the movable electrode is constituted by a thin leaf, which substantially in its gravital center is carried by a thin, distended conducting filament and during its movement towards the fixed electrode rotates about the axis of the filament while overcoming torsional resistance in the latter, that the movement of the leaf is visually observable directly or by the intermediation of optical means through a suitable portion of the wall of the casing, and that the leaf is so arranged with respect to the fixed electrode that each time a certain charge has been attained, it will make conducting contact with the fixed electrode, whereby it will swing back so that the oscillation frequency of the leaf will afford an indication of the intensity of the occurring charge current and hence of the radiation received.

Thus the indication is obtained directly by visual observation of a so-called oscillating electrometer, an indication of the intensity of the radiation being obtained directly from the striking frequency of the leaf. Hereby it becomes possible to dispense with any form of conversion and pointer mechanism, and since the leaf is suspended in its gravital center, the indication will be independent of the position in which the apparatus is kept. At the same time the indicator will be very robust not only because delicate mechanisms may be dispensed with, but also because inertia forces which may occur and which are the only outer forces to which the electrometer can be subjected, will be extremely small due to the low weight and moment of inertia of the leaf and thereby in spite of the very small cross-sectional dimensions of the filament can easily be taken up by the same, if desired in combination with a resilient mounting.

Further, due to the small cross-sectional dimensions of the filament and the low moment of inertia of the leaf the apparatus can be designed for high sensitivity.

The leaf is preferably placed with its width dimension extending in the longitudinal direction of the filament. Hereby a stable attachment to the thin filament is facilitated. Further, if the electrometer is suitably mounted in the field of vision, the movement of the leaf can thereby appear as a variation of area, which facilitates the observation of the oscillations, especially at high frequencies. Finally, this arrangement will to a certain degree cause the air resistance to come into play at the highest frequencies and attenuate the movement and hence the impact of the leaf against the counter-electrode at the higher velocities.

It may be convenient to arrange that the electrometer itself is surrounded by conducting walls connected to the voltage source with a polarity opposite to that of the electrode connected to the voltage source. Thereby a good control of the field distribution within and around the electrometer is obtained. In addition, the leaf with suspending device will have a charge-absorbing action due to ionization of air or gas in the surrounding space, which in particular may be utilized for a less sensitive indication by making the electrometer operate without absorbation of charges from any separate ionization chamber, as will be explained later.

In order to make the oscillation of the leaf uniform and controlled and hence clearly visible it is convenient to form the fixed counter-electrode with field-controlling fans outside either side edge of the leaf, which fans extend with decreasing width towards the side on which the leaf is located and obliquely outwards from each other, the whole so that the position of the leaf will constantly be a stable function of the total charge absorbed after the last discharge. Dependent on the intensity of the radiation the leaf will then move with a higher or lower velocity towards the counter-electrode, and as soon as it has made contact with the latter and has given off its charge, it will rapidly swing back to the starting position.

For the voltage source, for example a voltaic pile, a battery or a chargeable condenser mounted in the apparatus may conveniently be used. For use in stations at which usual mains voltage is present, it is of course also possible to use a combination of transformer and rectifier.

In order to make the indication particularly distinct the leaf may be provided in the path of the light from a light source mounted in the indicator, so that during its oscillating movement it will alternately close and open the light path. As a light source a small incandescent lamp or simply a fluorescent and/or phosphorescent member may be used.

In order to extend the possibilities of indication over what can be observed on a single electrometer having a definite characteristic it may be convenient to use two electrode pairs, one of which is adapted to perform many times the number of strokes performed by the other at the same radiation intensity. A practical manner of obtaining this is to make that electrode which is insulated from the voltage source, of one electrode pair, together with the parts conductively connected therewith, co-operate with a ionization volume many times as great as that with which the insulated electrode of the other electrode pair, together with the parts conductively connected therewith, is co-operating, so that one electrometer will have an oscillation frequency many times as high as that of the other at the same radiation intensity even if electrode pairs of substantially identical design are used.

Another way of extending the measuring range may consist in an alteration of the characteristic (number of strokes per radiation unit) of the electrometer. This may for example be achieved by turning the filament at one or both ends and hence changing the starting position of the leaf, so that the electrical field forces and the torsional resistance which the electrical forces have to overcome, will be changed. Or the volume or capacity of the ion-generating chamber may be changed, which may conveniently be achieved by arranging that the electrode connected to the charge receiving member is adapted to be disconnected from the latter, so that the chamber in which the electrodes are located will act alone as a ionization chamber and the sensitivity of the indicator will thereby be reduced.

Another possibility which, besides, may also be combined with the one last mentioned, may consist in altering the characteristic (numbe rof strokes per radiation unit) by changing the voltage applied. This may be convenient particularly if according to a further feature of the invention a counting tube is used as a ion-producing chamber in order to multiply the sensitivity.

It is not of essential importance for the invention whether that electrode of the electrode pair which is connected to the voltage source, is connected to the positive or to the negative pole of the latter, and whether it is the fixed or the movable electrode which is connected to the voltage source or the charge receiving member respectively. However, when using a counting tube of ordinary design it is necessary out of regard to the manner of operation of such tubes to connect the positive pole of the voltage source to one electrode of the electrode pair and connect the charge receiving member of the counting tube to the other electrode.

Although the invention is particularly intended to be used for the indication of γ-rays it will also be possible to use it for the indication of other kinds of radiation. Thus, an apparatus equipped with a counting tube and intended for γ-radiation may be provided with a window, which is penetrable for β-rays, in a wall of a chamber in which the counting tube is placed, the casing of the indicator being provided with a closable opening in front of the window.

Further it is contemplated to modify an apparatus in accordance with the invention with a view to obtaining an indication of non-radioactive radiation, for example infra-red radiation, by replacing the ionization chamber by an electric valve, for example a photo-cell, which is sensitive for the radiation concerned, and which in series with the electrode pair is connected to the voltage source.

Further features of the invention will appear from the following specification, reference being had to the accompanying drawings, which illustrate various embodiments.

Fig. 1 shows a longitudinal view, substantially on a natural scale of a radiation indicator according to the invention for field use.

Fig. 2 is a top view of the same apparatus on a larger scale and in partial section along the line II—II in Fig. 1.

Fig. 3 is a cross-sectional view, on the same scale as Fig. 2, of the cover of the same apparatus with parts mounted thereon, taken along the line III—III in Fig. 1.

Fig. 4 is a front view, substantially on a natural scale, of a second embodiment of the indicator for field use with the cover lifted off.

Fig. 5 is a view in vertical cross-section along the line V—V in Fig. 4 of the same indicator and on the same scale.

Fig. 6 is a cross section view along the line VI—VI in Fig. 5.

Fig. 9 is a diagram with linear abscissa and logarithmic ordinate showing the amplifying characteristic of a counting tube used in the embodiment illustrated in the Figures 7 and 8, showing the number of strokes of the electrometer per minute plotted against the voltage applied.

Fig. 10 is a diagram with logarithmic abscissa and logarithmic ordinate and illustrates the relation between number of Röntgen per hour and the number of strokes per minute for the various measuring ranges of the embodiment shown in Fig. 7, assuming a characteristic of the form shown in Fig. 9.

Figure 7:
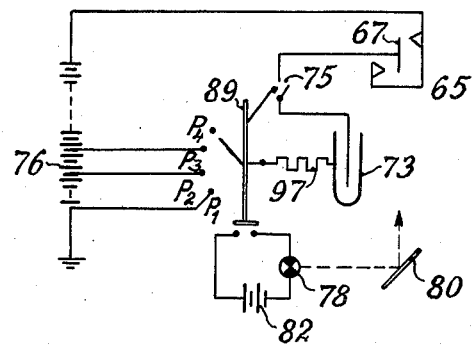
Fig. 7 is a circuit diagram for an embodiment with counting tube and adjustable voltage.

In the embodiment shown in Figures 1 to 3 the indicator has a watertight casing 1 for example of plastic, which at the top is closed hermetically by a cover 2 of transparent plastic. The cover 2 may for example be glued to said casing 1. The interior space of the casing 1 is divided by a partition 3 into a chamber 4, and a smaller auxilliary chamber 6. The chamber 4 serves as a ionization chamber and therefore has a conducting wall coating 5 for example of graphite paint, metal applied in vaporous form or the like. The smaller chamber 6 contains a cylindrical condenser 7. One pole 8 of the condenser is conductively connected to the coating 5 and passes through the bottom of the casing 1 into a recess 9 at the outside of the casing, whereas the other pole of the condenser is connected through a spring contact 10, attached to the inside of the cover 2, to a bolt 11 which passes through the cover into a recess 12 at the outside of the latter. In the recess 12 there is inserted a resilient diaphragm 13 through which extends a contact 14 which is normally kept spaced from the bolt 11 but may be pressed against the same by means of a terminal of a suitable voltage source for charging the condenser to a suitable voltage, for example 400 volt.

In the portion extending over the ionization chamber 4 the cover 2 is formed with a pair of downwardly projecting internal transverse walls 15 and 16, which support a metal wire frame 17. The frame 17 is conductively connected to the bolt 11 and carries the fixed electrodes of two electrometers substantially midway between the projecting walls 15 and 16. The fixed electrode of each electrometer consists of two parts 18 and 19 or 20 and 21 respectively, of thin metal sheeting, arranged substantially in radially symmetric relation about and insulated from a thin conducting filament 22 or 23 respectively, distended between fastening means 26, 27 or 28, 29 respectively, which are secured in said walls 15 and 16. Each of the filaments 22, 23, which may for example consist of tungsten filaments of a diameter of 1/100 mm. or possibly of a still thinner silver-coated quartz filament and may be connected to their fastening means by gluing, soldering or the like, carries substantially in the middle a conducting leaf 24 or 25 respectively, located between the fixed electrode portions 18 and 19 or 20 and 21 respectively, these leaves forming the movable electrodes of the electrometers and being capable, when charged oppositely to the fixed electrodes, of being pulled inwards towards the latter while overcoming torsional resistance in the supporting filaments 22, 23. Each leaf may for example consist of a mica leaf having a thickness of about 0.01 mm. and having a gold or silver coating applied in vaporous form and may be made with a weight of about 2 mg. and attached to the filament substantially in a gravital axis, so that inertia forces which may occur, will be minimized. A weight of the leaf of this order will only be a thousandth part of the transverse load which a tungsten filament of the said thickness can support. Instead of a metal-coated mica foil it is also possible to use a transversely corrugated metal foil (shown in Fig. 2), likewise of microscopic thickness.

In order to prevent the leaves 24, 25 from adhering to the appurtenant fixed electrodes the latter may be provided with a distinct contact point 18' or 20' respectively, if desired with a suitable coating for example of Aqua-dag.

The starting position of the leaves may conveniently be adjusted beforehand by turning one of the fastening means of the appurtenant filament, for example the fastening means 26 and 28 in the projecting wall 15.

As shown in Figures 2 and 3, the fixed electrodes 18, 19 and 20, 21 are shaped with field-controlling fans extending on either side of and tapering in the direction towards the appurtenant movable leaves 24 and 25 respectively, with a view to ensuring that the position of the leaves shall be a stable function of the potential difference between the fixed and the movable electrode and hence of the charging condition of the electrometer.

Conductively attached to one fastening member 26 for the supporting filament 22 of one of the electrometers is a charge receiving member 30 in the form of an areal-like wire projecting downwards substantially centrally in the ionization chamber.

The operation is as follows:

When the condenser 7 has been charged to a suitable D. C. voltage, for example with the negative pole at the bottom and the positive pole at the top, the conducting coating 5 adopts a corresponding negative potential with respect to the fixed electrodes 18, 19 and 20, 21 of the electrometers. The leaf 24 and the parts conductively connected thereto, viz. the filament 22, the fastening means 26, 27 and the areal wire 30, will then adopt an intermediate potential defined by the mutual ratio of the capacities with respect to the fixed electrodes and with respect to the wall coating. The same will be the case with the leaf 25 with the filament 23 and fastening means 28, 29.

Because of the potential difference between the poles of the electrometers the movable electrode will be attracted inwards to the fixed electrode, where it forms electrical contact and is charged to the same potential as the fixed electrode. Thereby the movable electrode is again repelled and adopts a starting position in spaced relation to the fixed electrode, for example as shown in Fig. 3.

So long as no ionizing radiation occurs, no visible movement of the leaves 24, 25 will thereafter take place. However, as soon as gamma-rays arrive, a ionization of the air in the ionization chamber will occur and negative ions will move to the wire 30, so that the latter with the leaf 24 will adopt a lower potential and the attraction between the leaf 24 and the counter-electrode 18, 19 will increase, so that the leaf will turn in the direction towards the electrode 18, 19, its position being at any moment defined by the amount of charge absorbed, that is by the quantity of ionizing radiation, so that the velocity of the leaves will be higher or lower according to the intensity of the radiation. When finally the leaf hits the fixed electrode it will give off its negative charge and adopt the potential of the fixed electrode, so that it is repelled and rapidly swung back into the starting position, whereafter the whole is repeated anew, so that the result will be that the leaf will oscillate to and fro with a frequency substantially proportional to the intensity of radiation. A normal characteristic for an electrometer of this kind is illustrated by curve $K_3$ in Fig. 10, which shows the radiation intensity in R. per hour for striking frequencies between one stroke per minute and about five strokes per second. By viewing the leaf through the cover 2 it is thus easily possible to estimate the intensity of the radiation and hence of its dangerousness, and by carrying the apparatus along to possible shelter spots it can easily be determined where the best shelter exists in the neighborhood.

Minor voltage variations, which may occur if the charging of the condenser 7 does not take place to an exactly predetermined voltage or in the case of a relatively long use between successive charging operations, will have a certain influence on the magnitude of the electrical field forces relative to the torsional resistance of the filament for the same starting position and hence also have some influence on the starting position.

However, this influence will be very small since the repelling field forces of the electrodes are much stronger than the attracting field forces acting between the leaf and the surrounding walls of the casing, and above all such minor voltage variations will be practically without influence on the magnitude of the radiation dosis required for making the leaf swing from the starting position into contact with the counter-electrode 18, 19 and hence on the intensity-stroke frequency characteristic of the apparatus.

If the striking frequency of the leaf 24 is so high that its movement is difficult to follow with the eyes, one may attach the attention to the leaf 25. Like the leaf 24 also this leaf will perform an oscillating movement, but since the leaf 25 with supporting means is surrounded by a much smaller ionization volume, the amount of charge absorbed per unit of radiation will be many times smaller, so that the electrometer will oscillate much more slowly, for example according to a characteristic curve as shown at $K_4$ in Fig. 10.

The two electrometers together will easily permit determining of intensities ranging from less than 1 to about 1000 R. per hour, the leaf 24 covering the range up to about 100 R. and the leaf 25 covering a range from about 10 to about 1000 R. per hour.

In the embodiment shown the indicator according to Figures 1 to 3 is extremely reliable in operation and easy to handle, since no operating knobs, control knobs or screws are used and, besides, the device may constantly be carried in the breast pocket, so that both hands are free for other tasks. Further, the device can be made with an average specific gravity below 1, so that it can float on water and be easily visible. The apparatus is capable of withstanding cold and moderate heat and can operate normally at temperatures from $-30$ to $+40$ centigrades. Because of its simple construction it can be produced at low costs and therefore it is suited for distribution among privates and among the civil population.

The embodiment according to the Figures 4 to 6 is intended to be used for similar purposes as the first embodiment, but presents improvements in various respects. Also in this case a flat casing 31 is used, which is closed watertight by a transparent cover 32 and has conducting internal coatings 33 so as to form an ionization chamber, but as a voltage source instead of a condenser a voltaic pile is used, which is placed in a cylindric internal casing 34 and is kept suitably compressed by a helical spring 35. Since such voltaic piles can be delivered for very long lifetime, no externally accessible contacts are required.

Like in the embodiment shown in Figures 1 to 3, at the inside of the cover 32 there are again mounted an areal wire 36 and two oscillating electrometers, each comprising a tungsten filament 37 and 38 respectively, oscillating leaves 39 and 40 respectively and fixed electrodes 41, 42 and 43, 44, respectively, carried by a fixed wire frame 45.

The latter is attached to a downwardly projecting stud 46, which to facilitate the illustration has been partly broken away in Figures 4 and 5.

However, in order to permit a more flat construction of the device the two electrometers are in this case mutually displaced laterally and the fastening members 47, 48 and 49, 50 respectively are each attached to one downwardly projecting stud under the cover. In order that the casing shall thereby not become too broad it has been made so high that the electrometer arrangement may extend over the top of the casing 34 of the voltaic pile. The fastening members 47 and 49 at one end are made in the form of leaf springs so as to keep the filaments 37 and 38 under a suitably elected tension and spare them from excessive stress caused by inertia forces resulting from thrusts, the fastening members 48 and 50 at the opposite end being in the form of screws which may be turned for adopting the starting position of the leaves.

In a rectangular field on either flat side of the casing 31, which in itself is made of transparent plastic, the graphite layer 33 has been omitted, so that a transparent window 51, 52 results. In the space between these windows and in positions under each leaf and in vertical alignment therewith there are mounted flat triangular blocks 53 and 54 respectively, of a suitable yellow-fluorescent material, which facilitates observation of the movement of the leaves, especially in weak light. In addition, along the upper edge of each of the triangles 53 and 54 there is placed a phosphorescent strip 55, 56 (for example a strip of plastic provided with a self-lighting paint, or hollow and transparent and containing a self-lighting powder) affording sufficient light to permit the movements of the leaves to be observed even in the darkness.

The window field or fields 51 and 52 may, if desired, be bridged by a grate or covered by a transparent conducting coating in order to obtain a more uniform electric field distribution within the casing.

The self-lighting substances of the members 53, 54 and 55, 56 respectively, may be elected so that they will light with different colors under the two electrometers in order to make it easier to distinguish between them.

One pole of the voltaic pile is connected by a conductor 57 to the coating 33, and the other pole thereof is connected by a conductor 58 to the wire frame 45, and the manner of operation will be the same as that described for the embodiment shown in the Figures 1 to 3, except that the phosphorescent material will cause increased background radiation, which will cause the leaf 39 connected to the filament 36 to perform one oscillation in every tenth to twentieth minute, which permits the operativeness of the instrument to be checked any time.

In order to keep the air in the apparatus dry a small plastic container 59 is glued to the inner face of the wall, which container has perforated walls and is filled with a drying substance 59', for example silica-gel.

Figure 8:
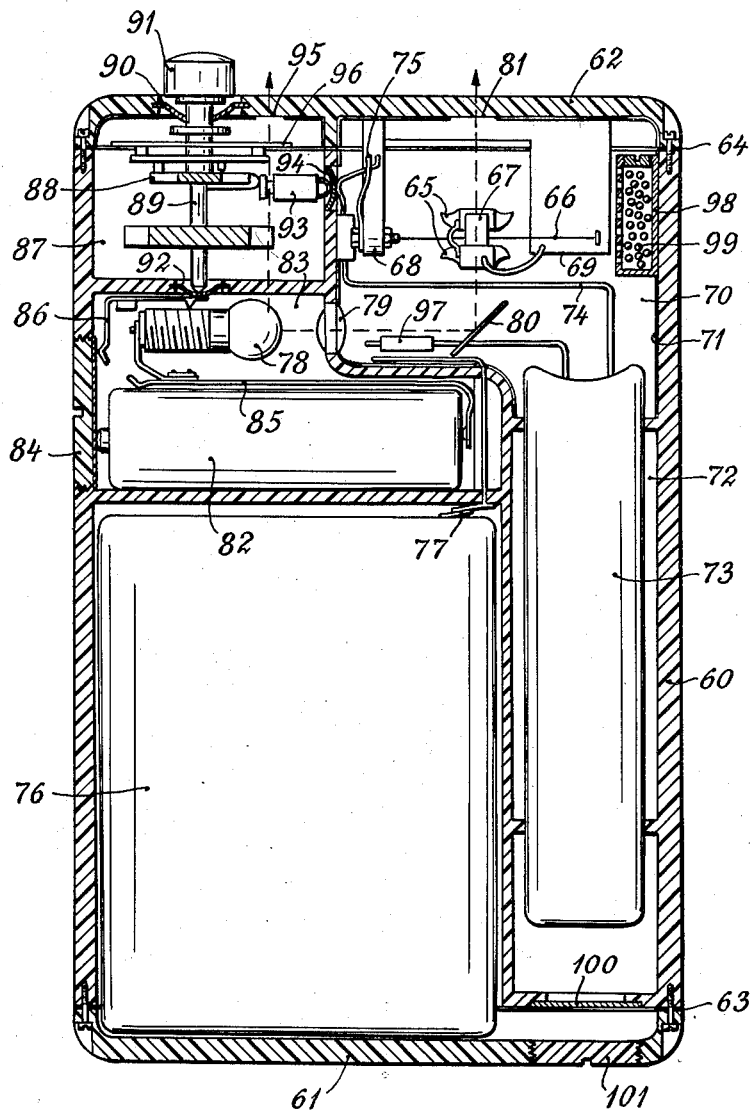
Fig. 8 is a longitudinal sectional view of such embodiment, substantially on a natural scale.

Whereas the embodiments so far described are intended for particularly simple devices which are not at all intended to be disassembled after the assembly, the Figures 7 and 8 illustrate a greater apparatus permitting several switching operations and permitting the casing to be opened for inspection and replacement. The casing 60 has a detachable bottom 61 and a detachable cover 62 fixed by screws with watertight packings 63 and 64 respectively inserted inbetween. One single electrometer comprising a fixed electrode 65, tungsten filament 66, leaf 67 and supporting studs 68, 69 is located in a separate chamber 70 with conducting wall coating 71 in the upper part of the apparatus. Downwardly from the chamber 70 extends a narrower chamber 72, accommodating a Geiger-Müller counting tube 73, which in this case is designed for serving as a ion-generating chamber and the charge-receiving member of which is connected to the filament 66 by a conductor 74 and contact means 75.

As a voltage source there is used a battery placed in a box 76, which can be removed on removal of the bottom 61 and is provided with resilient connection contacts 77. As a source of light there is used a pocketlight bulb 78, which by the way of a lens 79 in a wall of the chamber 70 and an inclined mirror 80 throws the light upwards through the electrometer and through an opaque translucent area 81 of the internally coated cover 62. The lamp 78 and an appurtenant pocketlight battery 82 are placed in a separate chamber 83, to which access can be had by means of an internally coated screw-cover 84. The battery 82 is held in position by a contact spring 85, which connects the lamp to one pole thereof and at the same time presses the opposite pole of the battery into contact with an internal conductive coating on the screw-cover 84, which also bears against a contact spring 86.

Finally, at the top beside the chamber 70 the apparatus comprises a chamber 87 accommodating a regulating switch 88. The shaft 89 of the latter is supported both for rotation and for axial displacement in the casing and projects upwards through a flexible diaphragm 90 in the cover 62 and is provided at its outer extremity with a detachable knob 91. When pushed into an inner position the shaft 89 through a diaphragm 92 causes contact of the spring 86 with the lamp 78. Further, the switch 88 in a certain rotational position opens the contact 75 by camming action with the intermediation of a displaceable member 93 and a flexible diaphragm 94 in the partition between the chambers 70 and 87.

In the light path between the lamp 78 and a transparent area 95 in the cover 62 over the chamber 87 there is placed a transparent dial plate 96 fixed to the shaft 89 in order to show the rotational position of the switch.

In order to keep the air dry in the apparatus—and especially in the chambers 70 and 72—there is glued to the inner face of the wall of the chamber 70 a small plastic container 98 with perforated walls and filled with a drying substance 99, for example silica-gel.

In the bottom of the chamber 72 a thin window 100 is mounted, which permits $\beta$-rays to pass to the counting tube on removal of a separate screw-cover 101 in the bottom 61 in vertical alignment under the window.

Fig. 8 does not show the construction of the switch 88 in detail, since it may largely be normal, nor does the figure show all electric connections, since these appear from Fig. 7.

In the embodiment shown the switch 89 has four rotational positions. In three of these, $P_1$, $P_2$ and $P_3$, it connects the wall of the counting tube chamber through a resistance 97 of about 22 M$\Omega$ to various voltages, for example $-415$, $-370$ and $-300$ volt on the battery 76 relative to the positive terminal thereof, which is connected to the fixed electrode 65 of the electrometer. In the fourth position $P_4$ the switch entirely opens the connection between the battery and the counting tube and likewise, at the contact 75, the connection between the central electrode of the counting tube and the leaf 67 of the electrometer. The negative terminal of the battery is in constant connection with the wall coating of the chamber 70 (indicated by the earth connection in Fig. 7).

The manner of operation will now be explained, reference being also had to the Figures 9 and 10.

When voltage is applied to the apparatus by insertion of the battery the electrometer will adopt a starting position as previously described.

If the switch is in position $P_1$, the electrodes 65 have a potential of $+415$ volt with respect to the cathode (chamber wall) of the counting tube, and since the leaf and hence the central electrode of the counting tube have been charged to the same voltage, the counting tube will have a voltage corresponding to its operating voltage of 415 volt.

When the instrument is subjected to radioactive radiation, for each pulse through the counting tube there will occur a flow of electrons to the central electrode. This electron flow neutralizes the positive charge in the central electrode and the swinging leaf. Thereby the swinging leaf becomes negative with respect to the fixed electrode, swings in and forms contact so that it will again be charged and repelled into the starting position. Thus, one oscillation of the leaf will occur for each pulse through the counting tube.

Because of the charge multiplying power of the counting tube at the operating voltage the instrument will be highly sensible in this position of the switch. The characteristic is illustrated by the curve $K_1$ in Fig. 10, and already usual background can cause 20 to 30 and in certain circumstances even up to 50 strokes per minute (the range below line $b$ in Fig. 10).

If a lower maximum sensitivity is desired, this may be achieved by a suitable dimensioning of the counting tube with respect to the electrometer, that is by so adapting the magnitude of the pulses from the counting tube relative to the charge-position characteristic of the electrometer that more than one pulse is required for causing an entire inward stroke of the leaf.

In Fig. 9 it is shown how the number of strokes varies with the voltage on the counting tube in an apparatus of the this kind, assuming a constant radiation intensity of 1 milliröntgen $\gamma$-radiation per hour corresponding to line $a$ in Fig. 10, the points corresponding to the elected voltages of 415, 370 and 300 volt respectively being indicated by $O_1$, $O_2$ and $O_3$ respectively.

It will be seen that the point $O_1$ is within the so-called "plateau" of the counting tube, at which the multiplying effect of the tube is substantially independent of voltage variations.

In the position $P_2$ of the switch, in which the cathode of the counting tube is connected to $-370$ volt with respect to the fixed electrode of the electrometer, the instrument operates in principle in the same way as in position $P_1$, but the ionization surge in the counting tube and hence the sensitivity are far smaller, the point $O_2$ for 370 volt in Fig. 9 being situated in the lower bend of the voltage characteristic, the so-called proportionality range, and an intensity characteristic as shown at $K_2$ in Fig. 10 results.

In the position $P_3$ of the switch, in which the cathode of the counting tube is connected to about $-300$ volt, one has arrived below the surge ionization range, as shown in Fig. 9 at $O_3$, and the counting tube will now act as a usual ionization chamber together with the chamber 70. The intensity charcteristic will be as shown at $K_3$ in Fig. 10.

In the position $P_4$ of the switch, in which the counting tube is entirely disconnected, the ionization chamber 70 operates alone, and the leaf 67 is now merely in connection with its suspending arrangement exactly like the slowly oscillating electrometer leaves in the two first embodiments. Therefore, in this range a rather strong radioactive radiation is required for initiating oscillations of the leaf, the intensity characteristic being as shown at $K_4$ in Fig. 10.

Thus, with an apparatus of this kind it is possible to cover an extremely great measuring range and, due to the light bulb, to observe the oscillations irrespective of outer light conditions. By selecting other voltage steps it is of course possible to cover further measuring ranges, for example in order better to bridge the gap between the characteristics $K_1$ and $K_2$ in Fig. 10.

Likewise it is of course possible by electing suitable designs of counting tubes having a different, for example a more uniformly ascending characteristic than that assumed in Fig. 9, to obtain other desired stroke frequency-radiation characteristics than that shown in Fig. 10.

Figure 11:
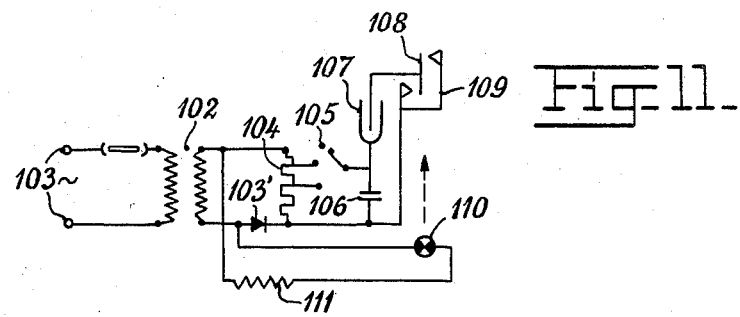
Fig. 11 is another circuit diagram for an indicator with counting tube and adjustable voltage designed for connection to an A. C. mains.

Fig. 11 illustrates a modified diagram as compared with Fig. 7, for the case that the apparatus can be connected to existing A. C. mains. Instead of a battery a transformer 102 is used, the primary terminals 103 of which are connected to the mains, and to the secondary of which there is connected a dry rectifier 103' in series with a resistance 104. Through a regulating switch 105 the whole or part of the resistance 104 is shunted by a condenser 106. Thus, through the rectifier 103' there will flow a suitable direct current, the pulsations of which will largely take their way over the capacity 106, so that a substantially constant direct current will flow through the resistance 104 and a substantially uniform D. C. voltage will be applied to the condenser in each position of the switch 105.

This D. C. voltage is connected to a counting tube 107 and an electrometer 108, 109 in series and with a polarity corresponding to that of the battery voltage in Fig. 7, and the transforming ratio of the transformer and the tappings from the resistance 104 to the switch 105 are adapted so that voltages are obtained which for example correspond to the switch positions $P_1$, $P_2$ and $P_3$ in Fig. 7. Thus, the manner of operation will be the same as that described for Figures 7 and 8, as it is of course possible even in this case, if desired, to add a fourth position of the switch in which the counting tube is disconnected. The lamp 110 is here connected to the constant secondary A. C. voltage of the transformer through a resistance 111.

Figure 12:
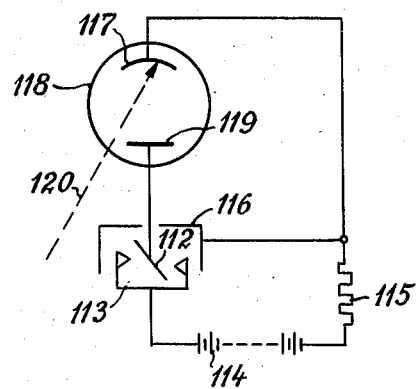
Fig. 12 is a circuit diagram illustrating in principle an embodiment with a photo-cell, for example for the indication of infra-red radiation.

Fig. 12 illustrates in principle an example for an application of the invention for indicating radiation which is not suited for causing ionization in a ionization chamber, but is capable of making a suitable electric valve conducting, for example infra-red radiation which is capable of energizing a photo-cell.

There is again used an electrometer with a movable leaf 112 and a fixed electrode 113 connected to the positive terminal of a D. C. voltage source 114. The negative terminal of the D. C. voltage source is connected through a resistance 115 to a counter-electrode 116, for example the wall of the electrometer chamber, so that in the latter an electric field is created, in which the leaf 112 adopts a starting position when the voltage is applied. The counter-electrode 116 is connected to the electron-emitting electrode 117 of a photo-cell 118, the counter-electrode 119 of which is connected to the electrometer leaf 112.

When the electrode 117 of the photo-cell is hit by a light ray 120 of a wave length for which the cell is sensitive, the electron current through the cell will cause the leaf 112 gradually to adopt a potential closer to that of the counter-electrode 116 and be attracted by the fixed electrode 113 of the electrometer, whereby for the rest the manner of operation will in principle be the same as that described previously for radioactive radiation.

It is to be observed that the present invention is not suited for carrying out particularly exact measurements within relative short intervals, since it relies on the counting of visible oscillations. But for field use and similar uses for which the invention is primarily intended, the precision will in general be amply sufficient.

I claim:
1. Radiation indicator particularly for radioactive radiation comprising in combination an airtight casing; at least one electrometer mounted within said casing and having at least one stationary electrode and a leaf counter electrode; a filamentary torsional support for the leaf electrode distending in front of the stationary electrode, holding the leaf electrode in substantially gravitational equilibrium in a rest position distanced from the stationary electrode and permitting the leaf electrode to rotationally oscillate from said rest position towards and from said stationary electrode; said leaf electrode while uncharged and in rest position being held out of contact with the stationary electrode by the relaxed torsional support; a voltage source; means creating an electric field in said casing; said means and said electrometer being connected in series between the terminals of said voltage source; at least a portion of the casing being at least translucent to expose for observation changing views of the leaf electrode oscillated by the electric discharge between said leaf electrode and said stationary electrode; the frequency of said changing views harmonizing with the oscillations of the leaf electrode and thus indicating the intensity of the existing radiation.

2. Radiation indicator particularly for radioactive radiation comprising in combination an airtight casing; at least one electrometer mounted within said casing and having at least one stationary electrode and a leaf counter electrode; a filamentary torsional support for the leaf electrode distending in front of the stationary electrode, holding the leaf electrode in substantially gravitational equilibrium in a rest position distanced from the stationary electrode and permitting the leaf electrode to rotationally oscillate from said rest position towards and from said stationary electrode; said leaf electrode while uncharged and in rest position being held out of contact with the stationary electrode by the relaxed torsional support; a voltage source; means creating an electric field in said casing; said means and said electrometer being connected in series between the terminals of said voltage source; at least a portion of the casing being at least translucent to permit observation of oscillations of the leaf electrode resulting from the electric discharge between said leaf electrode and said stationary electrode; and said filamentary torsional support being substantially parallel to said transparent portion of the casing to expose changing views of said leaf electrode, the frequency of such changing views harmonizing with the oscillations of the leaf electrode and thus indicating the intensity of the existing radiation.

3. Radiation indicator particularly for radioactive radiation comprising in combination an airtight casing; at least one electrometer mounted within said casing and having at least one stationary electrode and a leaf counter electrode; a filamentary torsional support for the leaf electrode distending in front of the stationary electrode, holding the leaf electrode in substantially gravitational equilibrium in a rest position distanced from the stationary electrode and permitting the leaf electrode to rotationally oscillate from said rest position towards and from said stationary electrode; said leaf electrode while uncharged and in rest position, being held out of contact with the stationary electrode by the relaxed torsional support; a voltage source; means creating an electric field in said casing; said means and said electrometer being connected in series between the terminals of said voltage source; a light source within said casing illuminating said leaf electrode; at least a portion of the casing being at least translucent to expose for observation changing views of the leaf electrode oscillated by the electric discharge, between said leaf electrode and said stationary electrode; the frequency of said changing views harmonizing with the oscillations of the leaf electrode and thus indicating the intensity of the existing radiation.

4. Radiation indicator particularly for radioactive radiation comprising in combination an airtight casing; an ionization chamber within said casing; at least one electrometer mounted within said chamber and having at least one stationary electrode and a leaf counter electrode; a filamentary torsional support for the leaf electrode distending in front of the stationary electrode, holding the leaf electrode in substantially gravitational equilibrium in a rest position distanced from the stationary electrode and permitting the leaf electrode to rotationally oscillate from said rest position towards and from said stationary electrode; said leaf electrode while uncharged and in rest position being held out of contact with the stationary electrode by the relaxed torsional support; a voltage source within the casing but outside the ionization chamber; electrical conduits connecting in series the wall of the ionization chamber to one pole of said source and the stationary electrode to the other pole thereof; at least a portion of the casing being at least translucent to expose for observation changing views of the leaf electrode oscillated by the electric discharges between said leaf electrode and said stationary electrode, the frequency of said changing views harmonizing with the oscillations of the leaf electrode and thus indicating the intensity of the existing radiation.

5. Radiation indicator particularly for radioactive radiation according to claim 1 wherein the stationary electrode is provided with field controlling fins obliquely extending therefrom with decreasing width on each side of the leaf electrode.

6. Radiation indicator particularly for radioactive radiation comprising in combination an airtight casing; at least one electrometer mounted within said casing and having at least one stationary electrode and a leaf counter electrode; a filamentary torsional support for the leaf electrode distending in front of the stationary electrode, holding the leaf electrode in substantially gravitational equilibrium in a rest position distanced from the stationary electrode and permitting the leaf electrode to rotationally oscillate from said rest position towards and from said stationary electrode; said leaf electrode while uncharged and in rest position being held out of contact with the stationary electrode by the relaxed torsional support; a voltage source; means creating an electric field in said casing; said means and said electrometer being connected in series between the terminals of said voltage source; at least a portion of the casing being at least translucent to expose the leaf electrode oscillated by the electric discharges between said leaf electrode and said stationary electrode; a light source situated beyond said oscillating leaf electrode to be concealed thereby in changing degrees, the frequency of such changes harmonizing with the oscillations of the leaf electrode and thus indicating the intensity of the existing radiation.

7. Radiation indicator according to claim 2 wherein the leaf electrode extends in a plane containing its filamentary torsional support.

8. Radiation indicator according to claim 4 comprising at least two electrometers of which at least one performs at the same radiation intensity a greater number of strokes than the others.

9. Radiation indicator particularly for radioactive radiation comprising in combination an airtight casing; at least one electrometer mounted within said casing and having at least one stationary electrode and a leaf counter electrode; a filamentary torsional support for the leaf electrode distending in front of the stationary electrode, holding the leaf electrode in substantially gravitational equilibrium in a rest position distanced from the stationary electrode and permitting the leaf electrode to rotationally oscillate from said rest position towards and from said stationary electrode; said leaf electrode while uncharged and in rest position being held out of contact with the stationary electrode by the relaxed torsional support; a voltage source; a radiation counting tube creating an electric field in said casing; the charge receiving member of said counting tube being connected to said torsional support; at least a portion of the casing being at least translucent to expose for observation changing views of the leaf electrode oscillated by the electric discharge between said leaf electrode and said stationary electrode; the frequency of said changing views harmonizing with the oscillations of the leaf electrode and thus indicating the intensity of the existing radiation.

References Cited in the file of this patent

UNITED STATES PATENTS

| | | |
|---|---|---|
| 2,577,253 | Lauritsen | Dec. 4, 1951 |
| 2,622,207 | Rich | Dec. 16, 1952 |
| 2,634,374 | Shonka | Apr. 7, 1953 |